# United States Patent [19]

Hwo

[11] Patent Number: 4,870,134

[45] Date of Patent: Sep. 26, 1989

[54] FILM, SHEET AND LAMINATE CAPABLE OF FORMING EASY-OPEN PACKAGINGS

[75] Inventor: Charles C. Hwo, Sugar Land, Tex.

[73] Assignee: Shell Oil Company, Houston, Tex.

[21] Appl. No.: 54,569

[22] Filed: May 27, 1987

[51] Int. Cl.$^4$ .............................................. C08L 23/08
[52] U.S. Cl. ................... 525/221; 428/516; 428/461
[58] Field of Search ............... 525/221; 428/516, 461

[56] References Cited

U.S. PATENT DOCUMENTS

| | | | |
|---|---|---|---|
| 3,362,940 | 1/1968 | Edwards | 260/88.2 |
| 3,879,492 | 4/1975 | Bontinick | 260/857 |
| 3,900,534 | 8/1975 | Schard | 260/897 |
| 4,189,519 | 2/1980 | Ticknor | 428/476 |
| 4,414,053 | 11/1983 | Karim et al. | 156/308.2 |
| 4,539,263 | 9/1985 | Hoh | 428/500 |
| 4,550,141 | 10/1985 | Hoh | 525/221 |
| 4,666,778 | 5/1987 | Hwo | 428/412 |

*Primary Examiner*—Edith Buffalow

[57] ABSTRACT

Film or sheets and a laminar structure fabricated from blends of an ethylene-carboxylic copolymer, a butene-1 homopolymer or copolymer, and a propylene homopolymer or copolymer.

27 Claims, No Drawings

FILM, SHEET AND LAMINATE CAPABLE OF FORMING EASY-OPEN PACKAGINGS

BACKGROUND OF THE INVENTION

The present invention relates to a heat sealable wrapping or packing film which is capable of forming a peelable seal. The seal is achievable either between two films of this kind, or between one film of this kind and a polypropylene packing film without the need for an adhesive between this film and the polypropylene.

A peelable seal is defined to be the seal or joint between two films produced by heat sealing or impulse sealing, the joint thus formed having the property of being able to open in the original plane of joining of the two films by the action of a pulling force, without wrenching off or tearing occurring in the material of the two films used to make up the joint. For the purposes of the present invention, the peelable seal must possess a mechanical resistance sufficient to maintain the wholeness and the tight-seal properties of the packing and wrapping during storage and transport until such time as the packing or wrapping is opened by the user of the article. The mechanical resistance of the peelable seal must be low enough to permit ready manual opening of the joint, i.e., without the use of any auxiliary instrument.

The invention relates to blends, and a method for making a blend usable in a flexible film package. This invention relates to films and/or laminates which are characterized by a nearly constant peel strength over an extended heat seal temperature range and by being peelable. The term "peelable" refers to a film having seal failure which occurs primarily at the interface of the sealing surface, and not by film tearing. The blends, films and/or laminates of the present invention permit the manufacture of a more consistent finished product, having a seal of predictable and constant peel strength, in spite of inevitable variations in the heat seal temperatures used in the production of such packages.

In the past, many variations of thermoplastic materials have been employed in the manufacture of films capable of forming peelable seals. See, for example, U.S. Pat. No. 4,189,519, to American Can, which discloses a blend for producing a peelable heat seal comprising (1) about 50 to 90 percent by weight of a copolymer of about 80 to 96 percent by weight ethylene and about 4 to 20 percent by weight of an ethylenically unsaturated ester, and (2) about 10 to 50 percent by weight of a crystalline isotactic polybutylene. While capable of forming a peel seal, the film of '519 discloses polybutylene as a minor component. The blend of '519 bonds to high density polyethylene (HDPE) without the use of adhesive, but will not bond to polypropylene without an adhesive.

U.S. Pat. No. 3,900,534 to Mobil Oil Corporation discloses thermoplastic shrink films with good heat seal characteristics and good optical properties, however, '534 does not address the need for a peel seal film.

U.S. Pat. No. 3,879,492 to UCB S.A. Belgium discloses blends of polybutylene+styrene-butadiene copolymer+LDPE+HDPE+polyisobutylene.

U.S. Patent No. 4,539,263 to E.I. DuPont de Nemours & Co. discloses peel seals based on blends of comonomers and propylene/α-olefin copolymer, however, '263 does not provide disclosure directed to polybutylenes.

U.S. patent application Ser. No. 750,342 discloses blends of polybutylene +EVA (or polyethylene) +polypropylene with polypropylene being less than 15 weight percent in the blend. However, non of these references teaches the novel invention.

A variety of other references teach heat sealable films capable of forming peels seals, such as U.S. Pat. Nos. 4,550,141 4,539,263, and 4,414,053. However, none of these references appear to teach the components of the film for forming an intimate packaging film structure as disclosed herein. For example in one embodiment, the instant invention teaches a method of blending a separate tie layer adhesive into a film such that the equipment needed to dispose the tie layer adhesive on the substrate is no longer necessary. The instant invention recognizes that conventional multilayer peelable seal films or sheets are comprised of substrates and peelable sealants which are generally not chemically compatible and accordingly, the present invention teaches a novel blend, and method of making a film which creates chemically compatible substrates and peelable sealants. The instant invention avoids delamination layers when sealed layers are pulled apart. In some embodiments a tie adhesive is utilized to bind incompatible substrates with sealants without the need for additional equipment to bind the adhesive between the sealant and the substrate. The novel and inventive method reduces manufacturing costs for producing peelable seals.

There has been a long felt need for a wrapping or packing material having easy peelability at the seal and yet which will bond to a substrate without the aid of an adhesive.

SUMMARY OF THE INVENTION

It has now been found that certain properties including the peel seal characteristics of wrapping films or sheets may be improved by fabricating films or sheets from blends having a major content of an ethylene-carboxylic acid copolymer ($>50$ w %) (preferably 50 to 90 weight percent), a minor content of butene-1 homopolymer or copolymer ($<25$ w %) (preferably 5 to 25 weight percent) and a propylene homopolymer or copolymer in the range of 5 to 45 weight percent (provided the amount of propylene comonomer in the propylene copolymer is equal to or greater than 25 weight percent). Such films or sheets are bonded to a substrate by coextrusion or extrusion lamination. Reference is made within this application to films, but sheets may be formed, as well.

The mixture of polymers of the present invention may range from about 55 percent by weight to about 700 percent by weight of the ethylene-carboxylic acid copolymer, from about 10 percent by weight to about 15 percent by weight of the butene-1 homopolymer or copolymer and from about 10 percent by weight to about 35 percent by weight of the propylene homopolymer or copolymer.

In the present invention, the film can comprise a mixture containing 65 percent by weight of an ethylene-carboxylic acid copolymer, equal to or less than 15 percent by weight of butene-1 homopolymer or copolymer, and at least 20 percent by weight of propylene homopolymer or copolymer.

DETAILED DESCRIPTION OF THE PREFERRED EMBODIMENT

Since the following terms will be used throughout the specification, particular definitions are now provided.

The term "polybutylene" refers to polymers of butene-1 hompolymer and butene-1 copolymers such as butene-1-ethylene, butene-1-propylene, and butene-1-alpha olefins having from 5 to 8 carbon atoms.

The term "polypropylene" refers to polymers derived from propylene, commonly represented as $CH_3-CH=CH_2$.

The term "ethylene-carboxylic acid copolymer" refers to copolymers having the molecular formula:

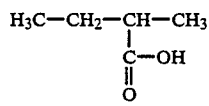

The compounds which come within the scope of this term can include, but are not limited to ethylene acrylic acid (EAA), ethylene methyl acrylic acid (EMAA), ethylene ethyl acrylic acid (EEAA), ethylene butyl acrylic acid (EBAA) and ethylene propyl acrylic acid (EPAA).

The term "high density polyethylene" refers to a resin such as DuPont Alathon ® 7815 polyethylene, with a melt index in the range of about 0.25 to about 6, and in particular about 0.45, and a density in the range of from about 0.944 g/cc to about 0.955 g/cc, and preferably 0.95 g/cc.

The term "tie layer adhesive" refers to the substance which is applied between the substrate and the peelable sealants to bind the peelable sealants to a substrate, such as nylon or polycarbonate.

The term "extrudate" refers to the substance which has been forced through the die of the extruder.

The term "peelable heat seal" refers to seals between two areas which are joined when heat is applied to the area and the areas can be peeled off from one another when stress is applied without tearing or shredding each area.

The term "peel sealability" refers to the sealed area of a film where the two parts are joined together. A film's peel sealability is measured by the degree of strength applied, such sealability can be measured by ASTM tensile strength testing method D-882.

The composition of the polybutylene employed herein is preferably of a film-forming grade, and can be obtained commercially from the Shell Chemical Company or prepared as described in U.S. Pat. No. 3,362,940. Preferably, the polybutylene has a melt index in the range of about 0.1 to about 500, and more preferably in the range of about 0.4 to about 7. More preferably, the polybutylene has a melt index of about 1 to about 4. Most preferably, the polybutylene has a melt index of 2±0.5.

The ethylene-carboxylic acid copolymer usable within the present invention can be, although is not limited to, one of the following compounds: ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

The propylene homopolymer or copolymer is blended into the mixture of butene-1 homopolymer or copolymer and ethylene-carboxylic acid copolymer for improvement of the processability of the mixture.

The novel polymer mixtures may be formed into an oriented or unoriented film by casting or film blowing method. After fabrication the film can be heat sealed by sealing jaws at a preset temperature, pressure and dwell. The seal strength is tested by an Instron tensile tester at 10″/min. crosshead speed. Maximum strength on a one inch width strip was designated as peel seal strength.

These manufacturing techniques apply to film, although this invention may also apply to sheeting. Film refers to shaped plastics that are comparatively thin and have a maximum thickness of 0.010 inches (10 mils). Sheeting is a shaped plastic having a thickness greater than 0.010 inches.

The present invention may also comprise the coating layer of a laminated structure which comprises a substrate. The ppel seal coat, which consists of a mixture of ethylene-carboxylic acid copolymer, butene-1 homopolymer or copolymer and propylene homopolymer or copolymer can be coated or laminated onto a desired substrate. The substrate can be a member of the group consisting of, but not limited to, nylon, high density polyethylene, aluminum foil, polycarbonate, polystyrene, polyurethane, polyvinyl chloride, polyester, polyacryonitrile, and polypropylene. Except for high density polyethylene, nylon, and the aluminum foil, the remaining substrates may require a tie layer adhesive for use with the novel films layer.

The laminated structure can be made by making two separate films that are then laminated. The lamination may be prepared from two separate films which were prefabricated by either film blowing (melt extrusion with a circular die) or the casting method (a flat die-melt extrusion process).

The resultant film article can be prepared by any suitable means, such as heat lamination or coextrusion. Coextrusion techniques that can be used for the preparation of the instant film include those described in detail in U.S. Pat. No. 2,480,998.

Melt extrusion with a flat die (casting) may be accomplished for thermoplastic polymers by using a flat die or slot die. The extrusion process starts with a polymer in a form that can be fed continuously into an extruder by means of a screw or pneumatic tube. Sometimes the polymers are combined with materials such as plasticizers, lubricants, stabilizers and colorants by means of Banbury mixers. The resulting mix is extruded through rod shaped dies and chipped into pellets. Pelletized polymer is fed into a screw conveyor into the end of a screw-type extruder and is heated and made into viscous fluid in a cylinder by means of a revolving, helical screw. The sheet emitting from the die is quenched on a temperature controlled chill roll. Finished films may be subject to a two-way stretching using continuous tenter-frame operations in biaxially orientation.

EXAMPLE 1

CAST FILM

DURAFLEX ® Polybutylene PB8340, obtainable from Shell Chemical Company, having a melt index of about 4.0 dg/mins (ASTM method D-1238 condition "E") and a density of about 0.901 was dry blended in a tumbler mixture with 75 w % of EAA (Dow Primacor 1430 Ethylene-acrylic Acid Copolymer) and 5 w % polypropylene (Shell PP5820) with a melt flow of 12. The resultant blend was coextruded with high density polyethylene (HDPE), DuPont Alathon ® 7815 at a die temperature of about 230° C. into film of about 3.00 mils in thickness using a flat die (2.5 mils of HDPE and 0.5 mils of the remaining components). Peel sample strength was tested. The coextruded films were laminated together in face to face contact, using 40 pounds per square inch of pressure and a dwell time of about 0.5 seconds. After the film was cooled, one inch wide strips were cut from the film at locations across its width for testing of the seal strengths. Physical properties are given for the film at different temperatures.

TABLE 1

Peel Seal Strength vs. Sealing Temperature For Coextruded HDPE/(EAA + 20 w % PB + 5 w % PP) Film

| Coextruded Film Structure | Peel Seal Strength, lb./inch Sealing Temperature, °F. | | | |
|---|---|---|---|---|
| | 260 | 280 | 300 | 320 |
| HDPE/(EAA + 20 w % PB + 5 w % PP) 2.5 mils/0.5 mil | 0.80 | 1.81 | 2.46 | 3.73 |

Note:
HDPE is DuPont Alathon 7815 High Density Polyethylene.
PB is Shell DURAFLEX ® PB8340 at 4.0 melt index.
EAA is Dow PRIMACOR ® 1430 Ethylene-Acrylic Acid Copolymer.
PP is Shell polypropylene 5820 at 12.0 melt flow.

As may be seen from Table 1, the film was tested for seal strength in pounds per inches at sealing temperatures of 260°, 280°, 300°, and 320° F. A satisfactory peel seal value is 1.0 lb/in or above. From the example, it has been unexpectedly found by applicant that the mixture of about 75 wt % of an ethylene-carboxylic acid copolymer, in particular EAA, about 20 percent butene-1 homopolymer or copolymer, and about 5 wt % propylene homopolymer or copolymer, results in a unique film which has good peel seal strength, (a satisfactory peel seal value) good processability (does not adhere to the processing equipment), and wil bond by coextrusion or extrusion lamination to a high density polyethylene substrate in a laminar structure without the need for an adhesive to achieve such bonding.

Shell Chemical Company DURAFLEX ® Polybutylene (PB 8340) as described in Example 1, was dry blended in a tumbler mixture with 80 weight percent (w %) of EAA (Dow PRIMACOR ® 1430 ethylene-arcylic acid copolymer and 5 w % polypropylene, Shell Chemical Company PP 5820 with a melt flow of 12).

The resultant blend was coextruded with nylon (Allied Chemical Company CAPRON ® 8209F) nylon 6, at a die temperature of about 230° C. into film of about 3.5 ml thickness (3.0 mils of nylon and 0.5 mils of the remaining components).

Peel sample strength was tested. The coextruded films were laminated together in face to face contact, using 40 pounds per square inch of pressure and a dwell time of about 0.5 seconds. After the film was cooled, one inch wide strips were cut from the film at locations across its width for testing of seal strengths. Physical properties are given below for different temperatures.

TABLE 2

Peel Seal Strength vs. Sealing Temperature For Coextruded NYLON/(EAA + 20 w % PB + 5 w % PP) Film

| Coextruded Film Structure | Peel Seal Strength, lb./inch Sealing Temperature, °F | | | |
|---|---|---|---|---|
| | 320 | 340 | 360 | 380 |
| NYLON/(EAA + 20 w % PB + 5 w % PP) 3.0 mils/0.5 mil | 0.29 | 0.92 | 1.25 | 1.62 |

Note:
NYLON is Allied Chemical's CAPRON 8209F Nylon 6.
PB is Shell DURAFLEX ® PB8340 at 4.0 melt index.
EAA is Dow PRIMACOR 1430 Ethylene-Acrylic Acid Copolymer.
PP is Shell polypropylene 5820 at 12.0 melt flow.

As may be seen from Table 2, the film was tested for seal strength in pounds per inches at sealing temperatures of 320°, 340°, 360° and 380° F. From this example, it has been unexpectedly found by Applicant that the mixture results in a unique film which has a satisfactory peel seal value and good processability and will bond by coextrusion to nylon in a laminar structure without the need for an adhesive tie layer to achieve such bonding.

What is claimed is:

1. A packaging film or sheet which is capable of forming peel seals, comprising:
   from about 5 percent by weight to about 25 percent by weight of the butene-1 homopolymer or copolymer;
   from about 50 percent by weight to about 90 percent by weight of an ethylene-carboxylic acid copolymer; and
   from about 5 percent by weight to about 45 percent by weight of propylene homopolymer or copolymer.

2. The packaging film or sheet of claim 1 which consists of:
   from about 55 percent by weight to about 70 percent by weight of said ethylene-carboxylic acid copolymer;
   from about 10 percent by weight to about 20 percent by weight of said butene-1 homopolymer or copolymer; and
   from about 10 percent by weight to about 35 percent by weight of said propylene homopolymer or copolymer.

3. The packaging film or sheet of claim 1 which consists of:
   about 65 percent by weight of said ethylene-carboxylic acid copolymer;
   about 15 percent by weight of said butene-1 homopolymer or copolymer; and
   about 20 percent by weight of said propylene homopolymer or copolymer.

4. The packaging film or sheet of claim 1, wherein said ethylenecarboxylic acid copolymer is selected from the group consisting of:
   ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

5. The packaging film or sheet of claim 1 which comprises an unoriented or oriented film.

6. A packaging film or sheet which is capable of forming peel seals, comprising:
from about 55 percent by weight to about 70 percent by weight of an ethylene-carboxylic acid copolymer;
from about 10 percent by weight to about 15 percent by weight of a butene-1 homopolymer or copolymer; and
from about 10 percent by weight to about 35 percent by weight of a propylene homopolymer or copolymer.

7. The packaging film or sheet of claim 6 which consists of:
about 65 percent by weight of said ethylene-carboxylic acid copolymer;
about 15 percent by weight of said butene-1 homopolymer or copolymer; and
about 20 percent by weight of said propylene homopolymer or copolymer.

8. The packaging film or sheet of claim 6, wherein said ethylene-carboxylic acid copolymer is selected from the group consisting of:
ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

9. The packaging film or sheet of claim 6 which comprises a biaxially oriented film or sheet.

10. A packaging film or sheet which is capable of forming peel seals, consisting of:
about 65 percent by weight of an ethylene-carboxylic acid copolymer;
about 15 percent by weight of a butene-1 homopolymer or copolymer; and
about 20 percent by weight of a propylene homopolymer or copolymer.

11. The packaging film or sheet of claim 10, wherein said ethylenecarboxylic acid copolymer is selected from the group consisting of:
ethylene-acrylic acid (EAA), ethylene-methyl acrylic acid (EMAA), ethylene ethyl-acrylic acid (EEAA), ethylene-butyl acrylic acid (EBAA), and ethylenepropyl acrylic acid (EPAA).

12. The packaging film or sheet of claim 10 which comprises an unoriented or oriented film or sheet.

13. A blend for producing a packaging film which is capable of forming peel seals, comprising:
from about 50 percent by weight to about 90 percent by weight of an ethylene-carboxylic acid copolymer;
from about 5 percent by weight to about 25 percent by weight of the butene-1 homopolymer or copolymer; and
from about 5 percent by weight to about 45 percent by weight propylene homopolymer or copolymer.

14. The blend of claim 13 which consists of:
from about 55 percent by weight to about 70 percent by weight of said ethylene-carboxylic acid copolymer;
from about 10 percent by weight to about 20 percent by weight of said butene-1 homopolymer or copolymer; and
from about 10 percent by weight to about 35 percent by weight of said propylene homopolymer or copolymer.

15. The blend of claim 13 which consists of:
about 65 percent by weight of said ethylene-carboxylic acid copolymer;
about 15 percent by weight of said butene-1 homopolymer or copolymer; and
about 20 percent by weight of said propylene homopolymer or copolymer.

16. The blend of claim 13 wherein said ethylene-carboxylic acid copolymer is selected from the group consisting of:
ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

17. A blend for producing a packaging film which is capable of forming peel seals, comprising:
from about 55 percent by weight to about 70 percent by weight of an ethylene-carboxylic acid copolymer;
from about 10 percent by weight to about 15 percent by weight of a butene-1 homopolymer or copolymer; and
from about 10 percent by weight to about 35 percent by weight of a propylene homopolymer or copolymer.

18. The blend of claim 17 which consists of:
about 65 percent by weight of said ethylene-carboxylic acid copolymer;
about 15 percent by weight of said butene-1 homopolymer or copolymer; and
about 20 percent by weight of said propylene homopolymer or copolymer.

19. The blend of claim 17, wherein said ethylene-carboxylic acid copolymer is selected from a group consisting of:
ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

20. A laminar structure comprising a substrate to which is bonded by extrusion lamination, a film or sheet, which is capable of forming peel seals, comprising:
from about 50 percent by weight to about 90 percent by weight of an ethylene-carboxylic acid copolymer;
from about 5 percent by weight to about 25 percent by weight of the butene-1 homopolymer or copolymer; and
from about 5 percent by weight to about 45 percent by weight of propylene homopolymer or copolymer.

21. The laminar structure of claim 22 which consists of:
from about 55 percent by weight to about 70 percent by weight of said ethylene-carboxylic acid copolymer;
from about 10 percent by weight to about 15 percent by weight of said butene-1 homopolymer or copolymer; and
from about 10 percent by weight to about 35 percent by weight of said propylene homopolymer or copolymer.

22. The laminar structure of claim 20 which consists of:
about 65 percent by weight of said ethylene-carboxylic acid copolymer;
about 15 percent by weight of said butene-1 homopolymer or copolymer; and about 20 percent by weight of said propylene homopolymer or copolymer.

23. The laminar structure of claim 20, wherein said ethylenecarboxylic acid copolymer is selected from the group consisting of:
ethylene acrylic acid (EAA), ethylene methyl acrylic acid (EMAA), ethylene ethyl acrylic acid (EEAA), ethylene butyl acrylic acid (EBAA), and ethylene propyl acrylic acid (EPAA).

24. The laminar structure of claim 20, wherein said film or sheet is unoriented or oriented.

25. The laminar structure of claim 20, wherein said substrate is nylon.

26. The laminar structure of claim 20, wherein said substrate is high density polyethylene.

27. The laminar structure of claim 20, wherein said substrate is aluminum foil.

* * * * *